UNITED STATES PATENT OFFICE.

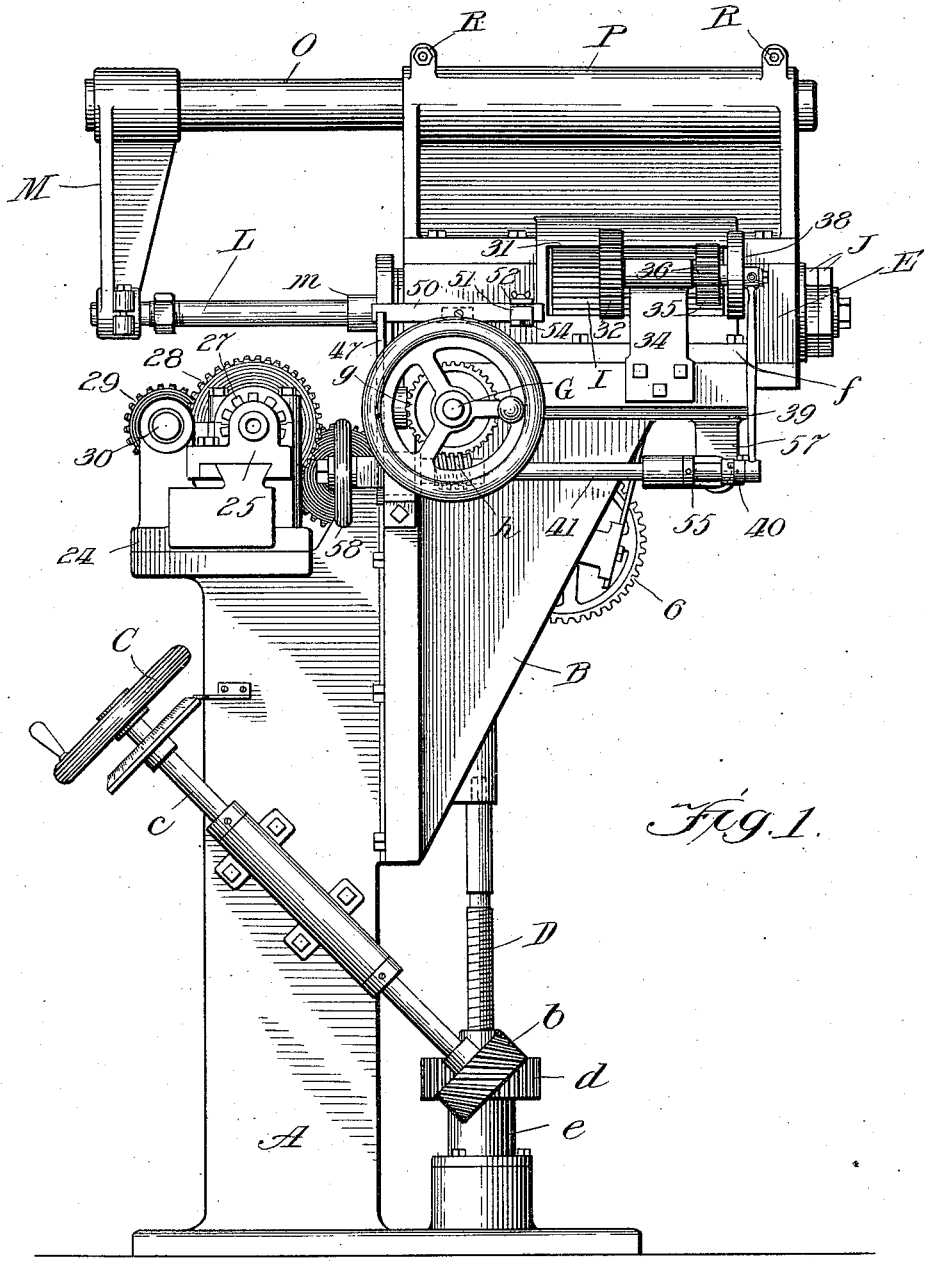

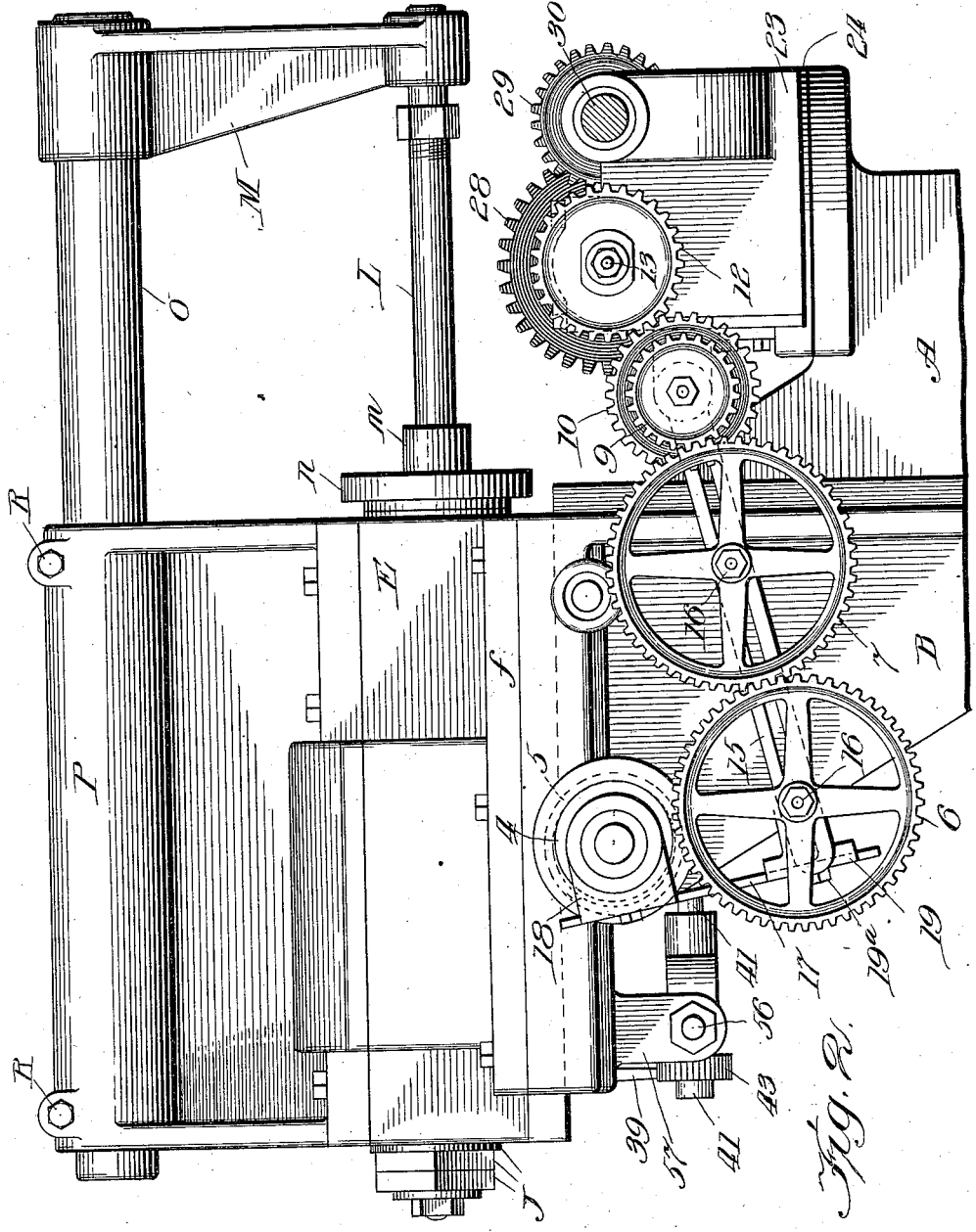

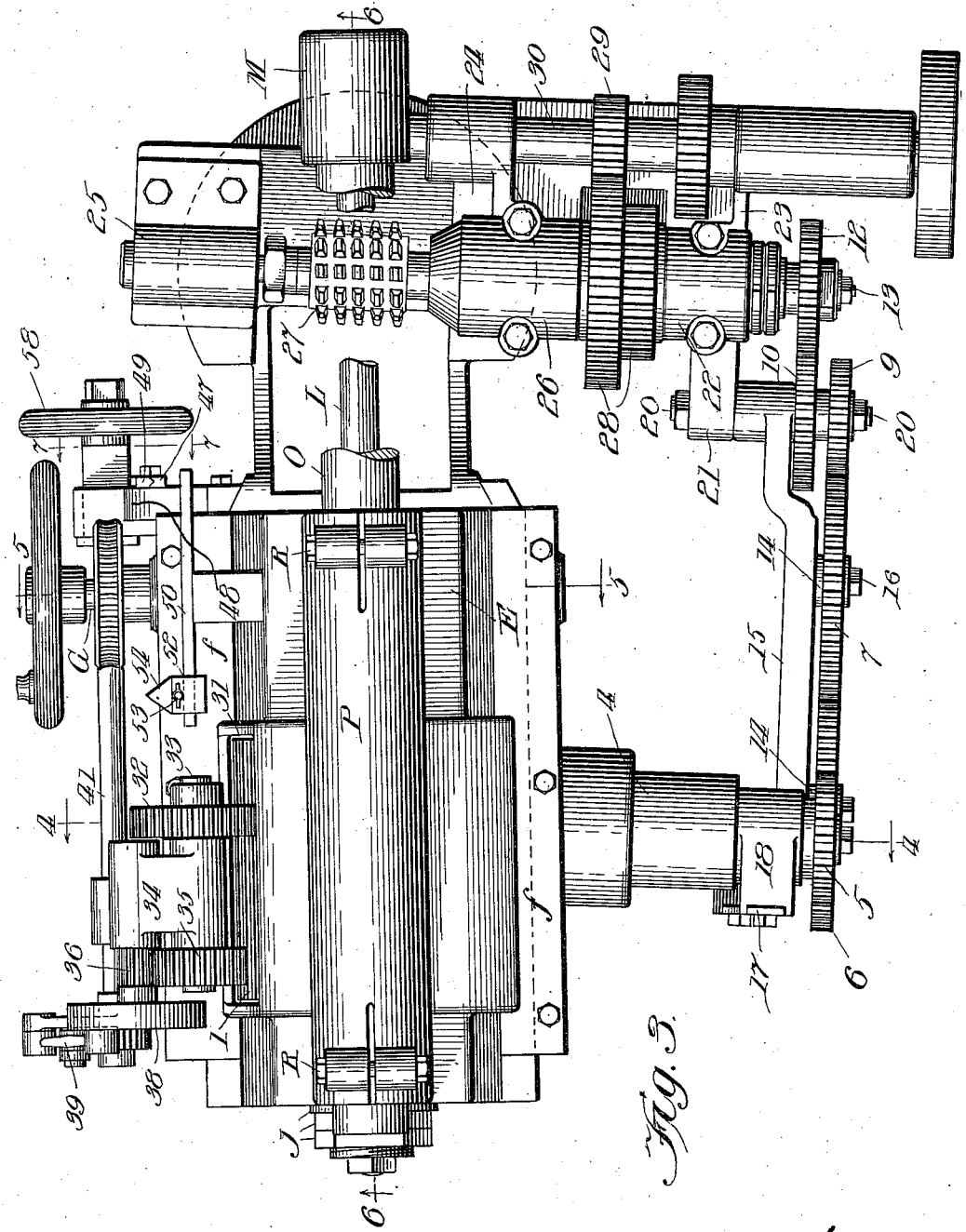

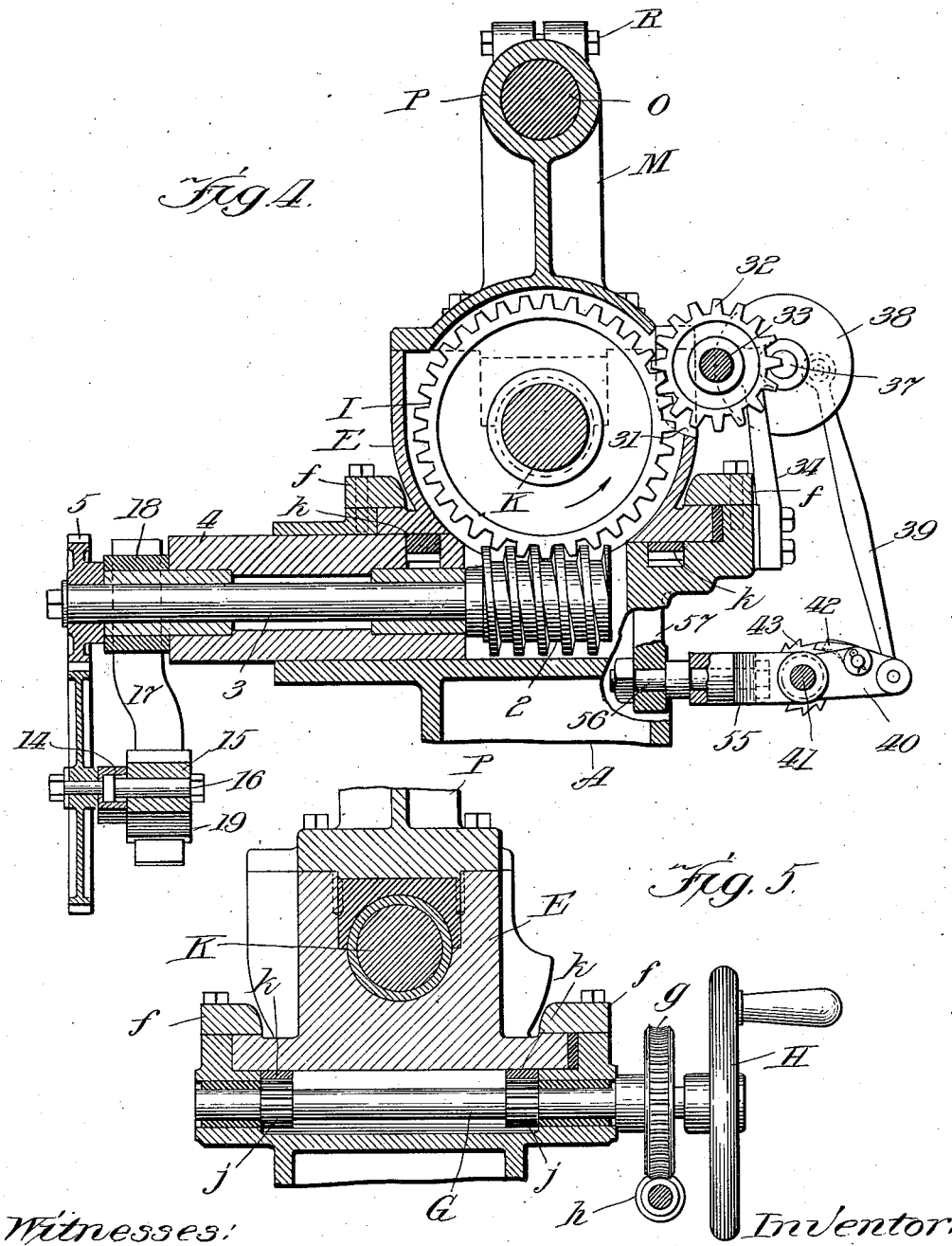

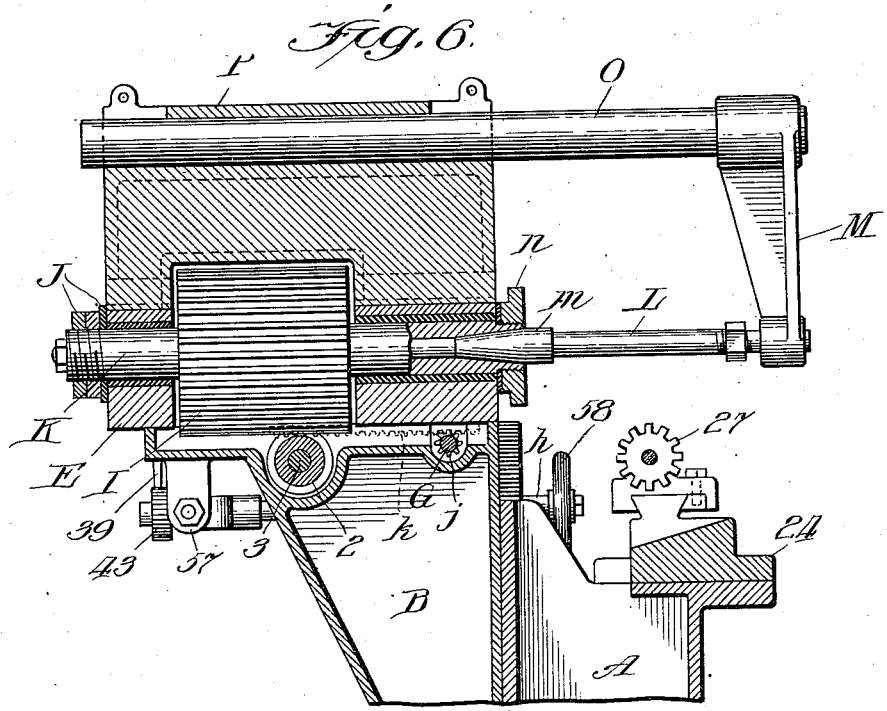
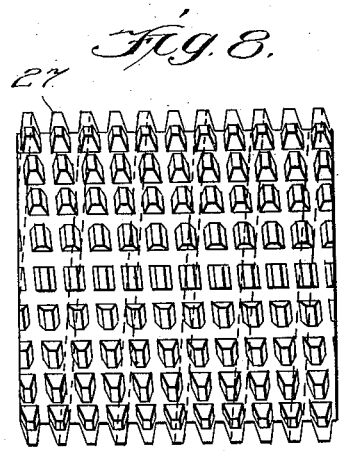
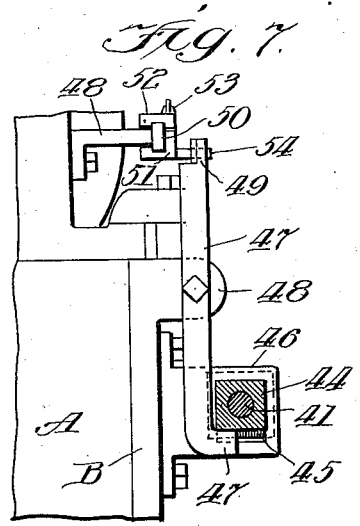

WILSON P. HUNT, OF MOLINE, ILLINOIS.

GEAR-HOBBING MACHINE.

1,012,643.  Specification of Letters Patent.  Patented Dec. 26, 1911.

Application filed March 4, 1910. Serial No. 547,216.

*To all whom it may concern:*

Be it known that I, WILSON P. HUNT, a citizen of the United States, residing at Moline, in the county of Rock Island and State of Illinois, have invented new and useful Improvements in Gear-Hobbing Machines, of which the following is a full, clear, and exact description.

My invention relates to a gear hobbing machine, and particularly to the kind employing a spirally toothed hob or cutter, and in which both the work and cutter rotate simultaneously, and make it possible to cut several teeth at the same time, by a continuous cutting action.

The object of my invention is to so arrange the hob shaft that the spirally arranged teeth of the hob will always cut into the periphery of the blank in a vertical plane at right angles thereto and parallel to the axis of the same.

A further object of my invention is to rotatively mount the hob and means for rotating the same on a fixed head, and feed the work past said hob.

Another object of my invention is to avoid adjustment of the hob-shaft support by the use of hobs of approximately constant or uniform thread-angle in the different pitches.

Still another object is to always maintain the parallelism of the hob-shaft and transmission shaft deriving motion therefrom and actuating the work-shaft, and automatically preserve the connection between the two.

All these objects and other important advantages, such as the rapidity of work, and producing theoretically correct gear teeth, I accomplish by the means hereinafter fully described and as particularly pointed out in the claims.

In the drawings:—Figure 1 is a side elevation of my improved machine. Fig. 2 shows an elevation of the upper portion of the side opposite that shown in Fig. 1, drawn to a slightly larger scale. Fig. 3 is a plan view of the same, but with a portion of the work-shaft broken away. Fig. 4 is a transverse vertical section thereof, taken on dotted line 4, 4, Fig. 3. Fig. 5 is a transverse vertical section, taken on dotted line 5, 5, Fig. 3. Fig. 6 is a longitudinal vertical section drawn to the same scale as Fig. 1 and taken on dotted line 6, 6, Fig. 3. Fig. 7 is a fragmentary view showing in front elevation the construction of the feed knockout mechanism. Fig. 8 is a detail view of a hob.

Referring to the drawings A represents a suitable base or supporting column, and B a suitable knee-frame, which is attached to the rear side of said column in such manner that it can be adjusted vertically by means of a hand-wheel C located in front of the column. This hand-wheel is mounted on the forward end of a downwardly and rearwardly inclined shaft, $c$, having bearings that are secured to the side of said column, and having a worm-gear $b$ on its lower end that engages a pinion, $d$, on a vertically disposed revoluble interiorly screw-threaded sleeve $e$, the heel of which latter has bearings mounted on a rearward extension of the basal flange of said column, and which has a jack-screw, D, engaging its bore. The upper end of screw, D, engages a boss in the lower part of said knee-frame, and when turned through the medium of said hand-wheel raises or lowers the same.

The top of knee-frame, B, is horizontally disposed and is channeled longitudinally to provide a seat for and to permit the longitudinal adjustment of the carrier, E, thereon. The longitudinal basal-flanges of carrier, E, rest on and have sliding contact with the rabbeted edges of the channel in the top of the knee-frame, and are confined, to prevent any vertical movement of said carrier, by means of clamping-strips, $f$, $f$. The longitudinal adjustment of the carrier is accomplished by means of a transverse shaft, G, that is journaled in bearings in the sides of the channeled portion of the top of said knee-frame and, preferably, the right hand end of this shaft, G, extends through its bearings and has a worm-wheel, $g$, mounted thereon and beyond said worm-wheel, a hand wheel, H. Between its bearings, shaft, G, is provided with a couple of small cog-wheels, $j$, $j$, which engage the longitudinal racks $k$, $k$, secured to the underside of the carrier.

The worm-wheel imparts an automatic intermittent movement to shaft G, and the hand-wheel enables the operator, after throwing the worm-wheel out of engagement with its actuating worm, $h$, (the means for accomplishing which will be hereinafter fully described) to move the carrier into any position desired within the limits of its longitudinal movement.

Extending centrally and longitudinally through the carrier is a work-shaft, K, and, at a suitable point between its ends it is provided with a comparatively large chamber in which the elongated master-gear, I, mounted on shaft, K, is located. The ends of shaft K project beyond the ends of the carrier to a slight extent, and it is provided with a suitable bore throughout its length. The rear end of said shaft is screw-threaded and provided with suitable nuts and a washer, J, to limit the forward movement of the shaft, and the forward end is reduced in diameter and has a nut and washer engage the same to limit the rear movement thereof. The forward end of the bore of shaft K is tapered or gradually widened, and a work-spindle L is extended rearwardly through the bore of shaft K until a cone-shaped boss, m, thereon fits snugly into the tapered mouth of said bore. In this position a nut, n, is tightened on the rear screw-threaded end of said spindle, and the latter is thereby immovably secured in said shaft K. Spindle, L, extends beyond the front end of the carrier some distance, and has its forward end fitted into the lower end of a pendent arm, M, whose upper end is mounted on the front end of a cylindrical beam or bar, O, that extends longitudinally through, and is clamped in the tubular upper portion of the carrier P by means of clamping-bolts, R, R, extending transversely through lugs arising from the split ends of said tubular portion, substantially as shown in the drawings. Between boss, m, and the pendent arm, M, preferably nearer the latter, I prefer to screw-thread the spindle, and mount a nut thereon, the purpose of which is to assist in securing the blank on said spindle. The blank is mounted on the spindle between arm, M, and cone, m, and by virtue of the construction hereinbefore set forth of the spindle and its connections, said blank can be very easily mounted or removed therefrom.

The master-gear, I, is engaged and driven by means of a worm, 2, located beneath the carrier and mounted on the end of a transverse shaft, 3, which latter is journaled in suitable bearings in the ends of a sleeve, 4, whose axis is at a slightly oblique angle to the longitudinal vertical plane of the axis of the work-shaft, K; say ninety-three degrees. The sleeve in which this shaft, 3, has bearings, is given a slight movement transverse to its axis by means of an eccentric bearing as shown in Figs. 2 and 4 to take up the wear on the worm, and the axis of this shaft, 3, is normally parallel to the axis of the hob-shaft, as will hereinafter more fully appear. The outer end of shaft, 3, is provided with a pinion, 5, and this is driven through the medium of larger corresponding transmission gear, 6, and 7, and the stepped gear, 9—10, by a gear, 12, on the end of the hob-shaft 13. The transmission gears, 6 and 7, are mounted on studs projecting from blocks 14, that are secured to a frame, 15, by bolts, 16, which latter extend through a longitudinally elongated slot in said frame 15, so as to permit of the longitudinal adjustment of said transmission gears, and adapt them to engage with gears, 5, and 9—10 of varying diameters, according as desired. In order to permit of the vertical adjustment of the knee-frame B without throwing the transmission gears out of mesh, said gears are adapted to be moved around in their bearing frame with said knee-frame. This adjustment is automatic with the vertical movement of the knee-frame and to accomplish this, the end of the frame terminating under gear, 5, is secured by means of a bolt to a head, 18, mounted on the bearings of shaft, 3, between gear, 5, and the outer end of sleeve, 4, and the lower end of this frame is adjustably secured in a groove in the outer surface of the T-shaped head, 19, of link 17 by means of bolt 19$^a$. The opposite end of frame 15 is provided with a pivotal boss, and is mounted on the spindle, 20, secured in and projecting from a lug, 21, between the idle-gears 9—10 mounted on the outer end of said spindle, and said lug. Lug, 21, is preferably, made integral with and projects rearwardly from the adjacent bearings, 22, of the hob-shaft.

Bearing 22 of the hob-shaft is secured to and arises from a horizontal platform, 23, projecting laterally from a plate, 24, and the bearing, 25, for the opposite end of said hob-shaft, is secured to and arises from the plate at a point diametrically opposite bearings 22. There is also another bearing, 26, for the hob-shaft located between bearing 22 and hob, 27, the center of length of the axis of which latter is intersected by the longitudinal vertical plane of the work-spindle at a suitable point below the same. Between bearings 22 and 26, a cone or stepped-gear, 28, is securely mounted thereon, and in the drawings the larger of these stepped gear is shown to be engaged by a pinion, 29, mounted on the drive-shaft, 30, which latter is journaled in suitable bearings secured to and made a part of the plate, 24, the details of construction of which it is unnecessary to describe in detail, excepting to say that the axes of the drive-shaft and the hob-shaft are always maintained in parallel relation.

The particular construction of the hobs used in connection with this machine are what I term a "multiple-thread" hob, the use of which permits a greater amount of work to be done, and the diameters of these hobs vary with the pitch of the teeth cut in the gears. This is made possible by the novel arrangement of the various parts of the machine herein described, and is employed in order to do away with the necessity for adjusting the hob-carrying head and its associated mechanisms. I prefer to make the thread-angle on the hob always substantially the same, and this angle being constant, thereby eliminates several elements from a gear cutting machine that have heretofore always been found necessary. Where the nature of the work requires fine pitches and in order to cut the same the hobs must be reduced to an inconveniently small diameter, the threads and the diameter of the hob are increased (according to a prescribed ratio) to bring the diameter of the hob up to a desirable working size to act efficiently upon the fine pitch gear. By a multiple-thread hob I mean, of course, one having more than one thread-line that continues spirally around the cylinder or slug from which the teeth of the hob are cut. An example of this construction of the hob is clearly illustrated in Fig. 8 of the drawings, wherein a double or two-thread hob is shown in detail. However, in the other figures of the drawings (for the sake of convenience in illustrating) a single thread hob is shown.

The side of the casing forming the walls of the enlarged chamber in the carrier in which the master-gear is located, is provided in the opposite side of the machine from which worm-shaft 3 projects, with a longitudinal opening, 31, conterminous with the length of the master-gear I. Through this opening the master-gear intermeshes with and actuates a pinion, 32, and the longitudinal shaft, 33, on whose forward end it is mounted. This shaft has bearings that are located in the upper end of a post 34, which is secured to and arises from the adjacent side of the top of the knee-frame, B, substantially as shown in Fig. 1 of the drawings. The rear end of shaft, 33, extends through its bearings and is provided with a pinion, 35, which latter engages a smaller pinion, 36, securely mounted on a longitudinal spindle, 37, journaled in bearings also secured to the upper end of post, 34, parallel and substantially in the same horizontal plane as shaft, 33. The rear end of spindle, 37, is provided with a crank-disk, 38, and, if desired, it may be provided with a radial slot (not shown) for the reception of the shank of a crank-pin. This crank-pin projects to the rear and is connected by means of connecting-rod, 39, to the outer end of an arm, 40, which latter is mounted next the rear end of the longitudinal shaft, 41, near the forward end of which the actuating worm, $h$, for the transverse shaft, G, is mounted. This arm, 40, has a spring actuated pawl, 42, pivotally secured thereto, which pawl engages a ratchet, 43, secured to the rear end of shaft, 41. Thus every time the arm, 40, is moved upward by virtue of the rotation of disk, 38, pawl, 42, imparts an intermittent motion to ratchet, 43, and shaft, 41 and through the gearing hereinbefore described, imparts motion to shaft G actuating the carrier.

In order to automatically throw the worm, $h$, out of engagement with the gear, $g$, on shaft, G, when the carrier has reached the limit of its forward movement, the forward bearing of shaft, 41, is made in a rectangular block, 44, that is fitted and is capable of a slight vertical movement in a vertically elongated opening, 45, made in a suitable bearing-frame, 46, that is bolted or otherwise secured to the upper portion of the vertical side of the knee-frame B adjacent to column A. This bearing-block is maintained at the upper limit of opening, 45, to keep worm, $h$, in engagement with gear, $g$, by means of a latch, 47, consisting of a straight vertically disposed bar, pivoted at about its center of length to a lug, 48, projecting laterally from the upper end of the knee-frame, and has its lower end bent outward, and adapted to catch under and support block, 44, substantially as shown in Fig. 7 of the drawings. The width of the upper end of latch 47, is, preferably, reduced to provide a finger, 49, the inner engaging edge of which is beveled.

Secured near its center of length to the outer end of a bracket, 48, secured to and projecting from the side of the carrier, is a horizontally disposed beam, 50. This beam is in the horizontal plane of the upper end of the latch, 47, is located slightly nearer the side of the carrier than said latch, and its fulcrum is located above and very near the vertical longitudinal plane of the axis of shaft, G, and mounted on this beam is a longitudinally adjustable tripping device consisting of a lower angle plate 51 that embraces the lower edge of beam, 50, and an upper plate, 52, which is connected to plate, 51, by a suitable thumb-nut and bolt 53, by tightening which said plate clamps the beam. A lug, 54, projects outwardly from the lower portion of the lower plate 51 of this tripping device, and has its outer edge pointed to provide a cam surface, which, when the carrier has about reached the limit of its forward movement, engages, the beveled edge of the finger, 49, of the latch, and pushes the same outward, so that the lower end of said latch will move out from under the bearing-block, 44, and let shaft, 41 drop until said bearing block rests on the lower edge of the opening 45. In this position the worm, $h$, will be out of engagement with gear, $g$, or shaft, G, and will cease to actuate the same. In order to permit of this limited vertical movement of the forward end of shaft, 41, its rear bearings, 55, are pivoted by a bolt, 56, or in any suitable manner, to a lug, 57, depending from the underside of the rear portion of the top of the knee-frame.

In order to enable the operator to rotate shaft 41 and move the carrier forward independent of the automatic devices, I disengage pawl, 42, from ratchet, 43, and extend the forward end of said shaft, 41, beyond its bearings and place a hand-wheel, 58, thereon which will be within convenient grasp of the operator.

The operation of my improved machine will be apparent from the foregoing description of the same, from which it will be gathered that the hob-shaft passes under the work-shaft upon which the gear-blank is mounted, at such an angle that the spirally arranged teeth of the hob will engage the work substantially parallel to the vertical longitudinal plane of the axis of the work-shaft, and approximately at right angles to the plane of the blank, and will cut the teeth in the blank so that the curvature of the sides of the teeth will be absolutely correct when finished.

What I claim as new is:—

1. A gear hobbing machine comprising a longitudinally reciprocable carrier, a longitudinal work-shaft journaled therein, an elongated master-gear mounted on said work-shaft, a laterally extending shaft having a suitable gear thereon that engages said master-gear, a transverse hob-shaft mounted in stationary bearings, and gearing connecting said hob-shaft and lateral shaft.

2. A gear hobbing machine comprising a longitudinally reciprocable carrier, a longitudinal work-shaft journaled therein, an elongated master-gear mounted on said work-shaft, means for reciprocating said carrier, a laterally extending shaft having a suitable gear thereon that engages said master-gear, a transverse hob-shaft mounted in stationary bearings, and gearing connecting said hob-shaft and lateral shaft.

3. A gear hobbing machine comprising a longitudinally reciprocable carrier, a longitudinal work-shaft journaled therein, an elongated master-gear mounted on said work-shaft, a laterally extending shaft having a suitable gear thereon that engages said master-gear, a transverse hob-shaft mounted in stationary bearings slightly oblique to said work-shaft, and gearing connecting said hob-shaft and lateral shaft.

4. A gear hobbing machine comprising a longitudinally reciprocable carrier, a longitudinal work-shaft journaled therein, an elongated master-gear mounted on said work-shaft, means for reciprocating said carrier deriving motion from said master-gear, a laterally extending shaft having a suitable gear thereon that engages said master-gear, a transverse hob-shaft mounted in stationary bearings slightly oblique to said work-shaft, and gearing connecting said hob-shaft and lateral shaft.

5. A gear hobbing machine comprising a longitudinally reciprocable carrier, a longitudinal work-shaft journaled therein, an elongated master-gear mounted on said work-shaft, a laterally extending shaft, having a suitable gear thereon that engages said master-gear, a transverse hob-shaft with which said lateral shaft is normally parallel and which is mounted in stationary bearings slightly oblique to said work-shaft, and automatically adjustable gearing connecting said hob-shaft and lateral shaft.

6. A gear hobbing machine comprising a revoluble work-shaft, an elongated gear mounted thereon, a longitudinally reciprocable carrier in which said work-shaft is journaled, a gear engaging said elongated gear mounted in independent stationary bearings, connections between said gear and carrier for imparting reciprocable movement to the carrier, a hob-shaft, and transmission gearing connecting said hob-shaft and elongated gear for actuating the work-shaft.

7. In a gear hobbing machine, the combination with a suitable work-shaft and a vertically adjustable carrier therefor, of a transverse hob-shaft, a lateral shaft adapted to impart motion to said work-shaft, an idle-gear deriving motion from said hob-shaft, transmission gear, adapted to impart motion from said idle gear to a gear on the outer end of said lateral shaft and a jointed frame carrying said transmission gear and connecting said lateral shaft and axial support of said idle-gear for accommodating said transmission gear to the vertical adjustment of said carrier.

8. In a gear hobbing machine, the combination with a suitable work-shaft and a vertically adjustable carrier therefor, of a transverse hob-shaft, a lateral shaft adapted to impart motion to said work-shaft, an idle gear deriving motion from said hob-shaft, two transmission gears, adapted to impart motion from said idle gear to a gear on the outer end of said lateral shaft and a jointed frame in which the journals of said transmission gear are adjustable longitudinally, and connect said lateral shaft and axial support of said idle-gear for accommodating said transmission gear to the vertical adjustment of said carrier.

9. In a gear hobbing machine a longitudinal reciprocable carrier having vertical adjustment, a longitudinal work-shaft journaled therein the forward end of which extends beyond said carrier, a master-gear on said work-shaft, a transverse shaft actuating said work-shaft, an overhead beam secured in said carrier whose forward end also extends beyond the carrier, a pendent arm on the forward end of said overhead beam into the lower end of which the forward end of the work-shaft is journaled, in combination with a transversely disposed hob-shaft, and gearing connecting said hob-shaft and transverse shaft.

10. A gear hobbing machine comprising a revoluble work-shaft, a gear mounted thereon, a longitudinally reciprocable carrier in which said shaft is journaled, a transverse hob-shaft mounted in fixed bearings slightly oblique to the work-shaft, means for transmitting motion from the hob-shaft to the work-shaft, and means for moving said carrier.

11. A gear hobbing machine comprising a longitudinally reciprocable carrier, means for moving said carrier longitudinally, a longitudinal work-shaft journaled in said carrier, an elongated master-gear mounted on said work-shaft, a laterally extending shaft having a suitable gear thereon that engages said master-gear, a transverse hob-shaft mounted in stationary bearings, and gearing connecting said hob-shaft and lateral shaft.

12. A gear hobbing machine comprising a longitudinally reciprocable carrier, a longitudinal work-shaft journaled therein, the forward end of which extends beyond said carrier, an elongated master-gear mounted on said work-shaft, an overhead beam secured to said carrier whose forward end extends beyond the carrier, a pendent arm on the forward end of said overhead beam into the lower end of which the forward end of the work-shaft is journaled, a laterally extending shaft having a gear thereon that engages said master-gear, a transverse hob-shaft, and gearing connecting said hob-shaft and said lateral-shaft.

In witness whereof I have hereunto set my hand this 25th day of January, 1910.

WILSON P. HUNT.

Witnesses:
　G. D. REYNOLDS,
　OLIVE HERO.

---

Copies of this patent may be obtained for five cents each, by addressing the "Commissioner of Patents, Washington, D. C."